(12) United States Patent
Doshi et al.

(10) Patent No.: US 11,372,722 B2
(45) Date of Patent: Jun. 28, 2022

(54) ENVIRONMENT INDEPENDENT DATA PROTECTION IN A HIGHLY AVAILABLE DATA SYSTEM

(71) Applicant: EMC IP Holding Company LLC, Hopkinton, MA (US)

(72) Inventors: Girish Doshi, Pune (IN); Ganesh Ghodake, Pune (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/086,866

(22) Filed: Nov. 2, 2020

(65) Prior Publication Data
US 2021/0049072 A1 Feb. 18, 2021

Related U.S. Application Data

(63) Continuation of application No. 15/722,778, filed on Oct. 2, 2017, now Pat. No. 10,824,510.

(51) Int. Cl.
*G06F 3/06* (2006.01)
*G06F 11/14* (2006.01)

(52) U.S. Cl.
CPC .......... *G06F 11/1448* (2013.01); *G06F 3/065* (2013.01); *G06F 3/067* (2013.01); *G06F 3/0617* (2013.01); *G06F 11/1464* (2013.01); *G06F 11/1471* (2013.01)

(58) Field of Classification Search
CPC ........ G06F 3/0617; G06F 3/065; G06F 3/067; G06F 11/1448; G06F 11/1464; G06F 11/1466; G06F 11/1471; G06F 11/1666

USPC .................................. 711/161, 162; 714/6.3
See application file for complete search history.

(56) References Cited

U.S. PATENT DOCUMENTS

| | | | |
|---|---|---|---|
| 8,380,951 B1 | 2/2013 | Krinke et al. | |
| 8,850,141 B2 | 9/2014 | Zohar et al. | |
| 8,984,243 B1 | 3/2015 | Chen et al. | |
| 9,104,331 B2 | 8/2015 | Hsu et al. | |
| 9,639,427 B1 | 5/2017 | Davis et al. | |
| 2012/0124307 A1* | 5/2012 | Ashutosh | G06F 11/1456 711/162 |
| 2015/0081994 A1* | 3/2015 | Christopher | G06F 16/00 711/162 |
| 2015/0378832 A1 | 12/2015 | Brown et al. | |
| 2016/0147608 A1* | 5/2016 | Anglin | G06F 11/1451 711/162 |
| 2017/0003899 A1 | 1/2017 | Raja et al. | |

* cited by examiner

*Primary Examiner* — Gary J Portka
(74) *Attorney, Agent, or Firm* — Workman Nydegger

(57) ABSTRACT

Systems and methods for providing data protection services are provided. In one example, data protection services are provided in a high availability system. Server side copies of the data stored in or by nodes or servers of the high availability system are generated. The server side copies are independent of the operating systems and storage hierarchies associated with the actual data. The resulting backup copies can be generated by storing metadata that includes references to the original data. The backup copies can also be restored without being hindered by the operating systems and storage hierarchies of the highly available system.

18 Claims, 4 Drawing Sheets

ENVIRONMENT INDEPENDENT DATA PROTECTION IN A HIGHLY AVAILABLE DATA SYSTEM

FIELD OF THE INVENTION

Embodiments of the present invention relate to systems and methods for protecting data. Embodiments of the invention further relate to systems and methods for protecting data in a highly available data system in is a manner that is independent of the environment in which the data of the highly available data system is stored.

BACKGROUND

Increasingly, data is being stored in the cloud. While the cloud may be an abstract location from the perspective of specific users, the cloud is actually a complex technical environment. Data, for example, cannot be stored abstractly and is ultimately stored on actual physical devices. Data is often stored in data centers that provide an immense amount of storage capability.

A large amount of storage capability can be provided in the cloud. Some of the data in the cloud is production data while other data is backed up data. In some instances, data stored in the cloud is also backed up in the cloud. For example, cloud data may be protected using snapshot technologies. In general, a snapshot of data is a copy of the data at a particular point in time. Snapshots can be taken regularly in order to fully protect the ever changing data.

However, snapshot technologies are often specific to a given operating system (OS) and storage stack software components (e.g., storage hierarchies). As a result, protecting the data requires that the data protection solution be built to accommodate each specific environment. In other words, the protection solution must account for the operating system, the storage stack software components, and the like. This places a burden, at least, on the software developer. There is also a need to copy the data from the application/production node to the backup target storage. This requires computing resources. In conventional cloud environments, the data is not independent of the environment and is not being protected in a manner that is independent of the environment in which the data is stored. Systems and methods are needed to improve the manner in which data is protected, particularly in a cloud environment.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
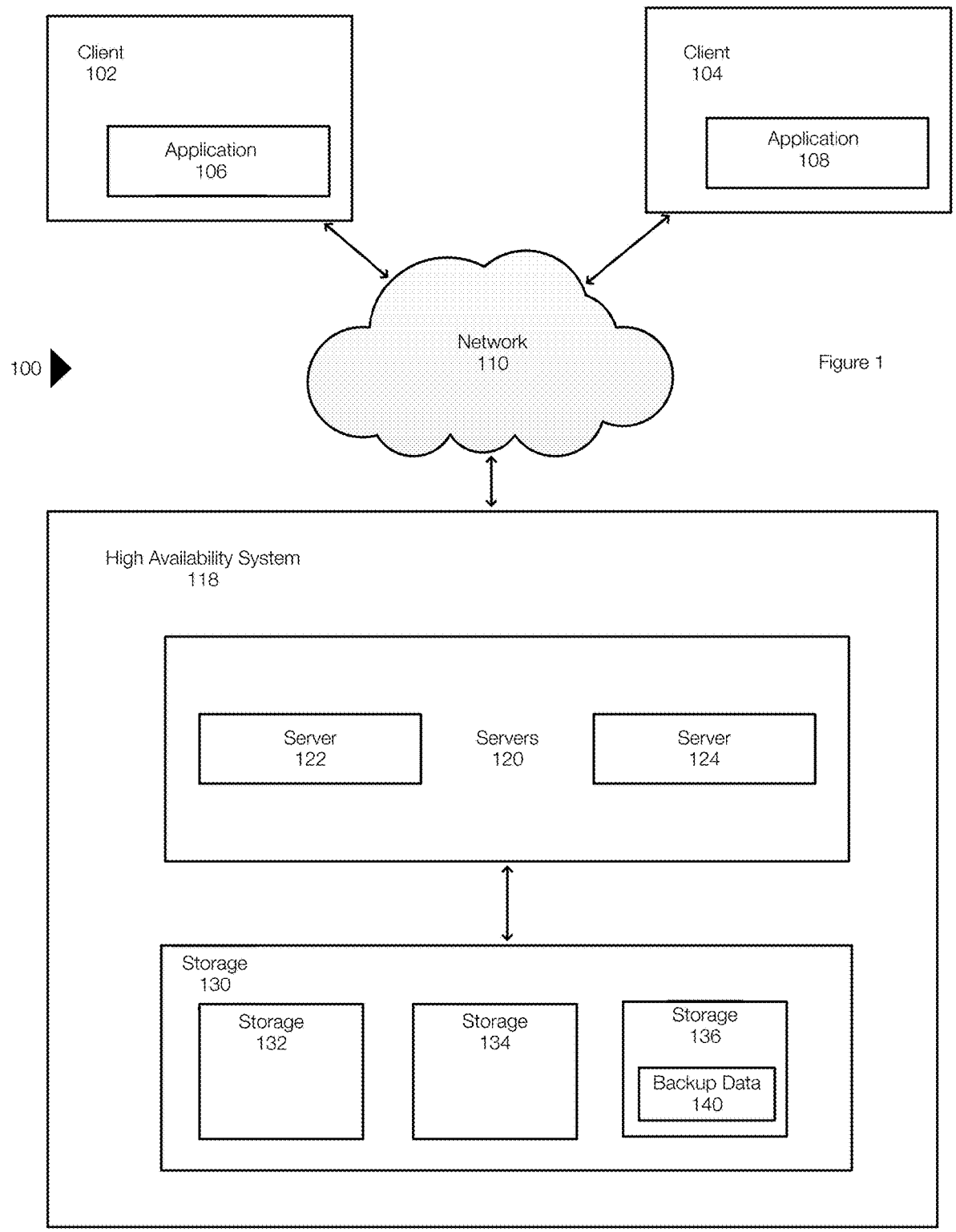
FIG. 1 illustrates an example of a highly available data system in a cloud environment that includes a data protection system that provides environment independent data protection.

Embodiments of the invention relate to systems and methods for protecting data in highly available data systems in an environment independent manner. The highly available data system can be protected independently of, by way of example, data system operating systems, data system storage stack software components, and the like.

Highly available data systems are often implemented in datacenters or, in the cloud. More generally, highly available data systems can be accessed over a network. Thus, the cloud can be viewed as a collection of computing devices that are configured to provide services, applications, data storage, and the like over a network such as the Internet. The cloud or datacenter may be provisioned storage devices, servers (e.g., application servers or production nodes), control devices, software applications, or the like. These components may be present, for example, in a data center, in multiple data centers, geographically dispersed locations, or the like. Further the datacenter may be a public cloud, a hybrid cloud, or a private cloud. Embodiments of the invention can be implemented in any cloud type.

Embodiments of the invention can further protect data wherever the data resides. For example, data may be stored on-premise (e.g., in a local network or storage device) and replicated to the cloud. Data and/or applications can be backed up directly to the cloud. Alternatively, applications using data stored in the cloud can reside on-premise or in the cloud. Further, the applications may be executing on virtual machines on-premise or in the cloud.

Embodiments of the invention may be embodied in highly available data systems. A highly available data system is a system that is intended to provide a certain degree of performance. This performance can be measured in different ways, for example using throughput, uptime, availability, or the like or combination thereof. A highly available data system is typically configured to eliminate different types of failure. This is often achieved by introducing redundancy into the highly available system. For example, a highly available system may include multiple servers or nodes. For example, when a server experiences a problem (e.g., fails), a failover procedure occurs such that another server can take the place of the failed server. When configured correctly, there is no or little interruption from the user's perspective. High availability can be with respect to servers/applications and/or data in the cloud.

Entities of all sizes store their data, including critical data, in high availability data systems with the objective of near zero downtime and of providing high level operational performance. By way of example, data stored in a high availability data system may be replicated to multiple nodes in the high availability system. This provides a layer of protection against scenarios like node and/or storage failure because the data is available through other live servers/nodes in the high availability data system.

These characteristics are some of the reasons why many databases (and other applications) are often deployed in a high availability (HA) system (e.g., a HA cluster). Even though high availability systems can ensure that the data are available almost always, high availability systems do not often provide protection against scenarios such as human error, software/hardware induced data corruption or the like. As a result, even in the cloud, there is a need to create a backup copy of the data and/or the application on a regular basis to protect against these types of scenarios. This can be achieved using snapshot technologies, data replication, mirroring, or the like.

In data centers, conventional data protection solutions typically rely on snapshot technologies. The snapshot technologies are deployed to create consistent images of the production data in order to create a backup copy of production data onto a backup target storage. As previously stated, the environments in data centers or in the cloud vary widely in terms of operating systems, storage stack hierarchies (i.e., File system, Logical Volume Manager, etc.), and hardware storage devices deployed. Thus, the snapshot technologies available for creating a consistent image for data protection also vary. Snapshot technologies such as, for example, for Volume Shadow Copy Service on Windows for software or hardware level snapshot is different from Unix which executes LVM software specific commands.

This diversity poses significant challenges for data protection solutions. Data protection systems, conventionally, are limited in the breadth and depth of the environment that they can cater to or the data protection solutions have to be built in order to maintain solutions for each of these diverse environments.

Embodiments of the invention relate to a novel way of protecting data residing in a high availability data system deployed in diverse environments by generating a server side copy. This eliminates dependency on the operating system and the storage stack native technologies to create a snapshot image for creating a backup copy. This also eliminates the need to copy data from the snapshot image on the application node onto the backup target storage. This saves CPU (central processing unit) cycles on the application node and also saves the time required to copy the data as part of backup process.

Embodiments of the invention relate to systems and methods for protecting data. When protecting data (e.g., generating and/or a backup of the data), the data may be compressed, de-duplicated, encrypted or the like. The backup data may be created using a server side copy function. In one example, a server side copy may not create an actual copy of the data. Rather, a server side copy may include metadata that represents the actual data or that points to the actual data (whether the snapshot image, production data, replicated data, etc.). As a result, the copy or backup operation is fast compared to actually copying the data. This process results in an environment independent copy of the data.

For example, in a highly available data system, storage for one of the non-primary servers or nodes may be provided by a data protection system (an example of such a data protection system is EMC Cloudboost). In the high availability data system, data replicated to the non-primary node is written or replicated to a node storage associated with the data protection system. By way of example and not limitation, a non-primary node is a node in an HA system that, at a given point in time, is used only as a read-only node in the high availability system. Writes in the high availability system happen via the primary node and the primary node (or other device) replicates the data to other nodes in the high availability system. Each node in the high availability system can have any operating system and storage hierarchy.

Next, a server or node associated with the data protection system creates a point in time copy of the data written to the non-primary node associated with the data protection system. This results in a server side copy of the data inside the context of the data protection system. This further creates a copy of the data that is independent of the operating system and the storage stack hierarchy of the node to which the data protection system is attached as storage. The data protection system, for example, can access the data based on the server side copy. Further, data can be deduplicated, restored, or the like from the server side copy.

Embodiments of the invention thus create a backup copy of data stored on the highly available data system by creating a server side copy such that the data is backed up without having dependency on environmental factors such as operating system, storage stack, or the like. In addition, there is no need to copy the actual data as part of the backup operation, which saves substantial processing cycles and system time. In one example, the server side copy contains information that relates to, identifies the location of, or points to the actual data.

FIG. 1 illustrates an example of system, such as a high availability system, that includes systems and methods for backing up data. FIG. 1 illustrates a system 100 that includes clients (represented as clients 102 and 104) that interact with a high availability system 118 over a network 110 (e.g. the Internet, LAN, WAN, or the like or combination thereof). The clients 102 and 104 may be part of the same local network and may be associated with the same entity.

FIG. 1 illustrates that the client 102 is using an application 106 to interact with the high availability system 118 and that the client 104 is using an application 108 to interact with the high availability system 118. The applications 106 and 108 can be the same application or different instances of the same application (e.g., email, work processing, spreadsheets, database, or the like) or different applications.

Although FIG. 1 illustrates that the applications 106 and 108 are executing on the clients 102 and 104, the applications could also be executing on servers 120 in the high availability system 118. In this example, the applications 106 and 108 may be web-enabled applications, thin clients or the like.

The high availability system 118 may include multiple servers 120 (or nodes). The servers 120 may be physical devices or virtual machines and are represented by servers 122 and 124. The servers 120 are also connected to or have access to storage 130, which is represented by storage 132, 134 and 136. The storage 132, 134, 136 may by physical storage devices.

In this example, each of the storage 132, 134 and 136 stores data associated with the clients 102 and 104. However, each of the servers 120 could be associated with its own storage. As discussed in more detail below, the storage 136 also stores backup data 140, which is a copy of the data stored by the storage 136 (and/or of any other storage included in the storage 130). The backup data 140 is also an example of a server side copy that is independent of the operating systems and storage hierarchies of the highly available system 118. The backup data 140 is distinct from any data replicated to the storage 136 from a primary node. Further, the backup data 140 may be generated from replicated data or from a copy of production data that may be stored on the node or server associated with the storage 136.

FIG. 1 illustrates that as the clients 102 and 104 interact with the high availability system 118, data is written and read from the storage 130. FIG. 1 further illustrates that the storage 136 is further configured to generate backup data 140. The storage 136 may be part of a data protection system that is configured to generate the backup data 140 of the data stored in the HA system 118 on the storage 130.

Because the storage 136 is storage that comes from a data protection system, any data replicated to the storage 136 (or more generally to the node) is written into the data protection system. Once the data resides in the data protection system, a server side copy can be generated inside of the data protection system. This allows the server side copy to be independent of the environment of the high availability system.

Figure 2:
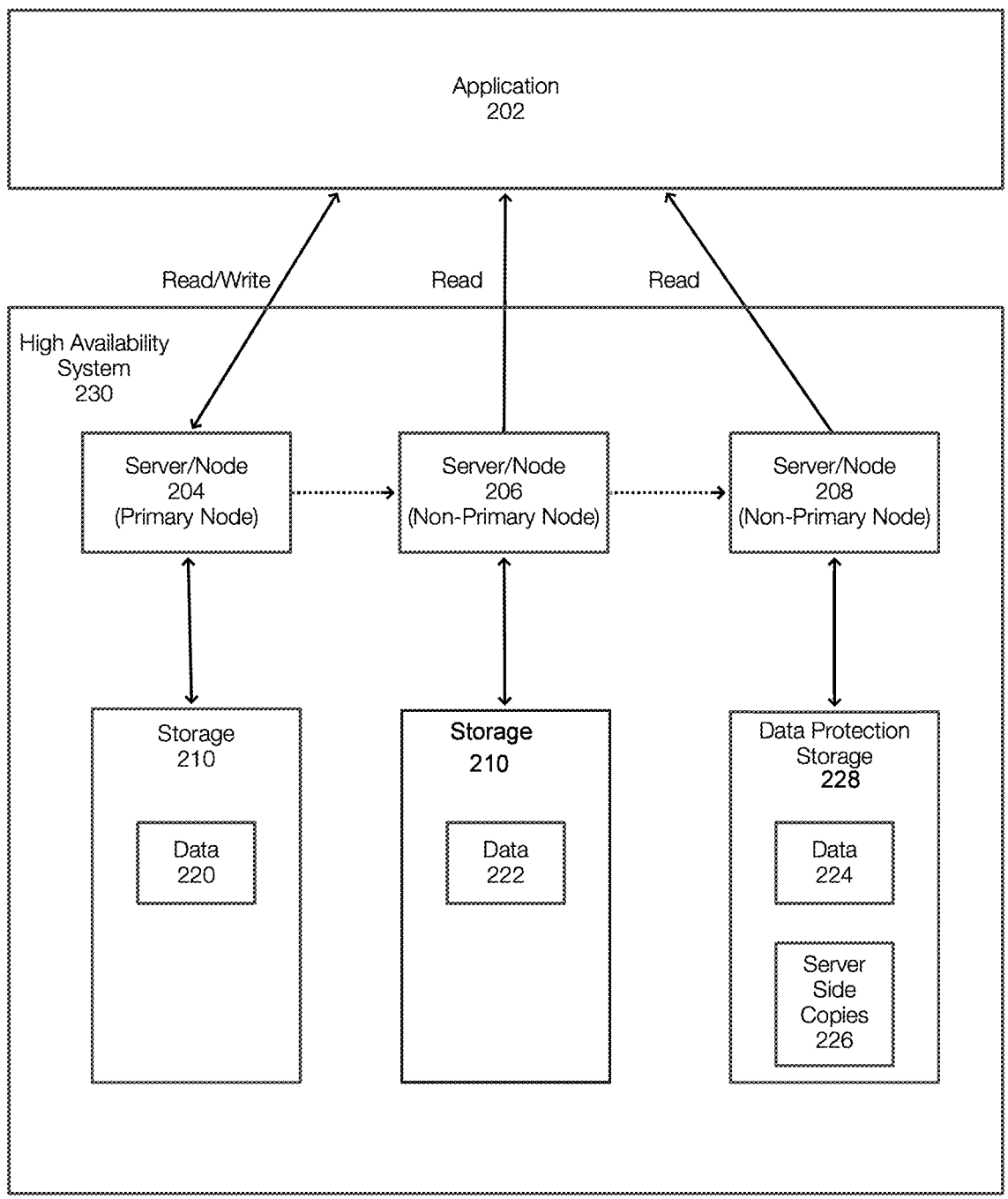
FIG. 2 illustrates an example of a highly available data system that includes an environment independent data protection system.

FIG. 2 illustrates another example of a data protection system that is included in a highly available data system 230 and that provides data protection services (e.g., backup, de-duplication, encryption, compression, restore) to the high availability system 230. The high availability system 230 illustrates a server/node 204 (hereinafter server 204). The server 204 may be a machine and may be virtualized on other hardware components. In some examples, reference to a server or node may also include a reference to storage associated with the server or node.

In this example, the server 204 is a primary node in the high availability system 230. Thus, the application 202 may read and write to the server 204 and storage 210. In this example, the server 204 is associated with storage 210, which stores the data 220 of the high availability system 230. The server 206, in this example, is a non-primary node and the server 208 is a non-primary node. The high availability system 230 may include multiple primary nodes and multiple non-primary nodes.

Whenever data is written to the storage 210, the server 204 ensures that the data is also written or copied or replicated to the server 206, which writes the same data to the data 222 on the storage 212. Stated differently, the data 220 is replicated to the storage 210 as the data 2222. The data 220 is also copied or replicated to the server 208, which writes the data to the data 224. As a result, the data 220, 222 and 224 are substantially the same. For example, writes to the storage 210 can be intercepted and then performed on the storage 210 and the storage 224. The replicating writes may occur substantially simultaneously or in succession. By replicating the data 220, the server 206 can become the primary node or server in the event that the server 204 and/or the storage 210 fail. The servers 204, 206, and 208 may communicate with each other and may use a heartbeat signal that allows the servers to determine the status of other servers.

The data 220, 222, and 224 are dependent on the environment of the high availability system 230. The data 220, 222, and 224 are dependent on the operating systems of the servers 204, 206, and 208 and are dependent on the storage structure, the storage stack, and the like.

The data protection storage 224, which is part of the high availability system 230 or integrated with the high availability system 230 is also part of a data protection system or is provided by the data protection system that provides data protection services. The data protection storage 224, in addition to storing a copy of the data 220 or of the primary node(s) is also configured to generate server side copies 226 of the data 224. In one sense, the server side copies 226 are independent of the operating system and storage hierarchies of the high availability system because the data can be retrieved or restored by the data protection system independently of the high availability system.

Figure 3:
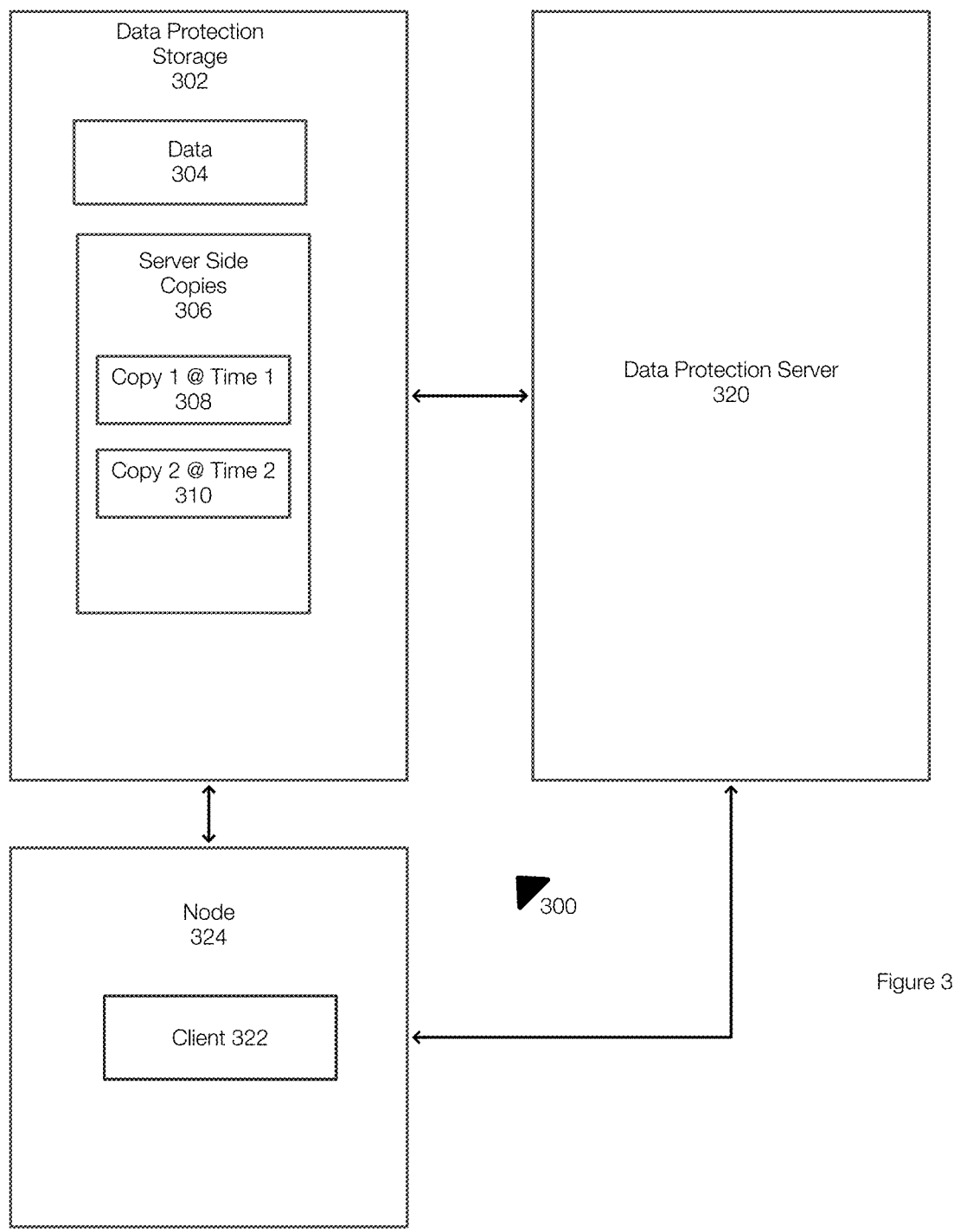
FIG. 3 illustrates an example of a data protection system that can be integrated into a highly available data system and provide environment independent data protection.

FIG. 3 illustrates an example of a data protection system. The data protection system 300 is an example of a data protection system that can provide services that may include, but are not limited to, backup operations, de-duplication operations, encryption operations, compression operations, restore operations, or the like or any combination thereof.

The data protection system may include a data protection server 320 that is associated with a client 322 that may be installed on a node 324 of a high availability system. The client 322 could be installed on the data protection storage 302. In one example, the data protection storage 302, in addition to being storage for a node or server of a high availability system or in addition to being a node in the high availability system, may also be a server capable of hosting and running the client 322. The data protection storage 302 may be an appliance (physical or virtual) of the data protection system that is integrated with the high availability system. The data protection server 320 could also be implemented on the node 324. Thus any one of the data protection storage 302, the data protection server 320, and/or the node 324 may be part of the data protection system and may be integrated wholly or partially with the high availability system.

In FIG. 3, the data protection server 320 can coordinate with the client 322 to generate server side copies of the data 304. In one example, the client 322 may initiate a snapshot operation on the data protection storage 302. Thus, the copy 1 at time 1 308 corresponds to a snapshot of the data 304, which is a replica of the data at the primary node of the high availability system. The copy 2 at time 2 310 corresponds to a snapshot of the data 304 at a subsequent time. As previously suggested, the server side copies, even if generated using snapshots, may only contain metadata that, in one example, points to the data 304.

Any number of server side copies can be generated by the data protection server 320 and/or the client 322 and/or the data protection storage 302. Further, the server side copies can be managed such that older copies are regularly deleted, archived, compressed, de-duplicated or managed as necessary.

The server side the copies are smaller in size than the data 304. The server side copies may include metadata that point to chunks, entire files, or the like. In one example, the metadata included in the server side copies may include pointers to corresponding portions of the data 304. The server side copies may also point to data on storage associated with other servers or nodes of the high availability system.

The server side copies 308 and 310 (which are representative of multiple server side copies) are not dependent on the operating systems present in the various servers of the high availability system and are not dependent on the storage hierarchies present in the high availability system. The server side copies 308 and 310 may be stored on a storage device that is separate from the data protection storage 302 or on the storage 302.

Advantageously, this eliminates the dependency of the data stored on non-primary nodes from the operating system and storage stack native technologies used to create a snapshot image for creating a snapshot copy. Further, there is no need to copy data from a snapshot image on an application node or server onto backup storage.

Figure 4:
FIG. 4 illustrates an example of a method for protecting data in a manner that is independent of the environment in which the data is stored and backed up in a highly available data system.

FIG. 4 illustrates an example of a method for performing data protection operations with a data protection server. In one example, the method 400 shown in FIG. 4 is performed in the context of a high available system.

The method 400 begins when a server side copy of data is initiated 402. The server side copy can be initiated by a data protection server, by a client associated with the data protection system, or the like. The server side copy can be configured to be performed in accordance with a predetermined schedule, on an ad hoc basis, in accordance with user instructions, or the like.

In one example, the server side copy of the data is initiated by issuing a command to take a snapshot of the data stored in the high availability system. This may include the need to quiesce the data (e.g., flush any caches or the like) so that the snapshot is in a consistent state.

After the server side copy has been initiated, the data protection system (e.g., the client) may begin copying 404 metadata or writing metadata of the data into a server side copy. The metadata may include a reference to the original data. For example, the server side copy may point to data in the snapshot of the data or may point to the original data. If the high availability system creates snapshots, the server side copies can point to the data in the snapshots or to the original data.

Data protection services can optionally be performed 406 on the server side copies. The server side copies, for example, can be de-duplicated, encrypted, compressed, or the like. The server side copies can also be managed 408. This may include deleting old copies as necessary or the like. The server side copies may also be verified, de-duplicated, compressed, archived, or the like.

With continued reference to FIG. 3, the data protection storage 302 may be an appliance (virtual or physical) that can be integrated into any combination of private and/or public cloud environments. By associating with a node of a high availability system, the data protection storage 302 provides access to cloud data objects such that the data objects can be backed up or such that other data protection operations can be performed with respect to the cloud data objects.

The client 322 and or the data protection server can establish policies that determine when data is protected, what data is protected, where the backup data is sent, and how long the backup data is retained.

It should be appreciated that embodiments of the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data protection operation, the method comprising:

storing data, by a high availability system, data into storage of a data protection system, wherein the storage of the data protection system is attached to a node of the high availability system, wherein the storage of the data protection system is used by both the high availability system and the data protection system;

generating, by the data protection system, server side copies of the data stored in the storage of the data protection system by the high availability system, wherein the data protection system generates the on server side copies that are independent a storage hierarchy of the high availability system, wherein the server side copies are generated by copying metadata of the data stored in the high availability system, wherein the server side copies are stored on the storage of the data protection system and wherein the metadata references the data stored by the high availability system on the storage of the data protection system; and performing data protection services on the server side copies by the data protection system.

2. The method of claim 1, wherein the high availability system and the data protection system are configured to write to the storage of the data protection system.

3. The method of claim 1, wherein the data of the high availability system and the d server side copies of the data protection system are both stored on the storage of the data protection system, wherein the d server side copies are independent of the high availability system and can be accessed and retrieved independently by the data protection system.

4. The method of claim 1, wherein the server side copies include only metadata pointing to the data written by the high availability system.

5. The method of claim 1, wherein the server copies are point in time copies of the high availability system and are independent of operating systems or storage hierarchies in the high availability system.

6. The method of claim 1, wherein the data protection services include a recovery operation to recovery from one of the server side copies.

7. The method of claim 1, further comprising replicating data of the high availability system to the storage of the data protection system.

8. The method of claim 1, further comprising generating the server side copies without requiring a separate time window to copy the data of the high availability system as part of a backup operation.

9. The method of claim 1, further comprising placing the data protection system on a node of the high availability system.

10. The method of claim 1, further comprising verifying, deduplicating, compressing, and/or archiving the server side copies.

11. A non-transitory computer readable medium comprising computer executable instructions that, when executed, perform a method for performing a data protection operation, the method comprising:

storing data, by a high availability system, data into storage of a data protection system, wherein the storage of the data protection system is attached to a node of the high availability system, wherein the storage of the data protection system is used by both the high availability system and the data protection system;

generating, by the data protection system, server side copies of the data stored in the storage of the data protection system by the high availability system, wherein the data protection system generates the on server side copies that are independent a storage hierarchy of the high availability system, wherein the server side copies are generated by copying metadata of the data stored in the high availability system, wherein the server side copies are stored on the storage of the data protection system and wherein the metadata references the data stored by the high availability system on the storage of the data protection system; and performing data protection services on the server side copies by the data protection system.

12. The non-transitory computer readable medium of claim 11, wherein the high availability system and the data protection system are configured to write to the storage of the data protection system.

13. The non-transitory computer readable medium of claim 11, further comprising wherein the server side copies include backups of the data of the high availability system, further comprising:

placing the data protection system on a node of the high availability system, and verifying, deduplicating, compressing, and/or archiving the server side copies.

14. The non-transitory computer readable medium of claim 11, wherein the data of the high availability system and the server side copies of the data protection system are both stored on the storage of the data protection system, wherein the server side copies are independent of the high availability system and can be accessed and retrieved independently by the data protection system.

15. The non-transitory computer readable medium of claim 11, wherein the server side copies include only metadata pointing to data written by the high availability system.

16. The non-transitory computer readable medium of claim 11, wherein the server copies are point in time copies of the high availability system and are independent of operating systems or storage hierarchies in the high availability system, wherein the data protection services include a recovery operation to recovery from one of the server side copies.

17. The non-transitory computer readable medium of claim 11, further comprising replicating data of the high availability system to the storage of the data protection system.

18. The non-transitory computer readable medium of claim 11, further comprising generating the server side copies without requiring a separate time window to copy the data of the high availability system as part of a backup operation.

* * * * *